United States Patent
Guha et al.

(10) Patent No.: US 7,484,050 B2
(45) Date of Patent: Jan. 27, 2009

(54) HIGH-DENSITY STORAGE SYSTEMS USING HIERARCHICAL INTERCONNECT

(75) Inventors: Aloke Guha, Louisville, CO (US); Chris T. Santilli, Colorado Springs, CO (US)

(73) Assignee: Copan Systems Inc., Longmont, CO (US)

( * ) Notice: Subject to any disclaimer, the term of this patent is extended or adjusted under 35 U.S.C. 154(b) by 435 days.

(21) Appl. No.: 10/937,665

(22) Filed: Sep. 8, 2004

(65) Prior Publication Data

US 2005/0055501 A1    Mar. 10, 2005

Related U.S. Application Data

(60) Provisional application No. 60/501,227, filed on Sep. 8, 2003.

(51) Int. Cl.
    *G06F 12/04* (2006.01)
(52) U.S. Cl. .................. 711/154; 711/162; 711/114
(58) Field of Classification Search ............... 711/154, 711/114, 162, 165, 112; 714/4, 5, 6; 707/204
    See application file for complete search history.

(56) References Cited

U.S. PATENT DOCUMENTS

| | | | |
|---|---|---|---|
| 4,914,656 A | 4/1990 | Dunphy | |
| 5,088,081 A | 2/1992 | Farr | |
| 5,265,098 A | 11/1993 | Mattson | |
| 5,274,645 A | 12/1993 | Idleman | |
| 5,301,297 A | 4/1994 | Menon | |
| 5,479,653 A | 12/1995 | Jones | |
| 5,530,658 A | 6/1996 | Hafner et al. | |
| 5,666,538 A | 9/1997 | DeNicola | |
| 5,680,579 A | 10/1997 | Young et al. | |
| 5,787,462 A | 7/1998 | Hafner et al. | |
| 5,835,700 A | 11/1998 | Carbonneau | |
| 5,845,319 A | 12/1998 | Yorimitsu | |
| 5,961,613 A | 10/1999 | DeNicola | |
| 5,966,510 A | 10/1999 | Carbonneau | |
| 6,098,128 A | 8/2000 | Velez-McCaskey | |
| 6,219,753 B1 | 4/2001 | Richardson | |
| 6,279,138 B1 | 8/2001 | Jarav | |
| 6,363,462 B1 * | 3/2002 | Bergsten | 711/162 |
| 6,393,537 B1 * | 5/2002 | Kern et al. | 711/162 |
| 6,460,122 B1 * | 10/2002 | Otterness et al. | 711/154 |
| 6,526,478 B1 | 2/2003 | Kirby | |

(Continued)

OTHER PUBLICATIONS

Asaca/Shibasoku Corp of America, publication DM200, 1 page from www.asaca.com/DVL/DM_200.htm, Oct. 7, 2003.

(Continued)

*Primary Examiner*—Pierre-Michel Bataille
(74) *Attorney, Agent, or Firm*—Charles J. Kulas; Trellis IP Law Group, PC

(57) ABSTRACT

A system and method for coupling a host to a drive in a high-capacity data storage system are disclosed. The data storage system comprises a number of drives arranged in a hierarchical manner. A control system is provided for controlling input/output of data and managing control signals. The control system comprises a hierarchy of controllers and switches. The control system receives a request for a drive from a host and couples the host to the requested drive through the hierarchy of controllers.

39 Claims, 10 Drawing Sheets

U.S. PATENT DOCUMENTS

| | | |
|---|---|---|
| 6,601,138 B2 | 7/2003 | Otterness |
| 6,763,398 B2 | 7/2004 | Brant et al. |
| 6,859,865 B2 * | 2/2005 | De Margerie et al. ....... 711/162 |
| 6,951,274 B2 * | 10/2005 | Zeitler et al. ................ 198/890 |
| 7,035,972 B2 | 4/2006 | Guha et al. |
| 7,076,679 B2 * | 7/2006 | Fischer et al. ............... 713/501 |
| 7,152,142 B1 | 12/2006 | Guha et al. |
| 7,210,004 B2 | 4/2007 | Guha et al. |
| 7,210,005 B2 | 4/2007 | Guha et al. |
| 7,219,156 B1 * | 5/2007 | Brown et al. ................ 709/238 |
| 7,222,216 B2 | 5/2007 | Guha et al. |
| 2002/0007464 A1 | 1/2002 | Fung |
| 2002/0062454 A1 | 5/2002 | Fung |
| 2002/0144057 A1 | 10/2002 | Li et al. |
| 2003/0196126 A1 | 10/2003 | Fung |
| 2003/0200473 A1 | 10/2003 | Fung |
| 2003/0204759 A1 | 10/2003 | Singh |
| 2003/0212859 A1 | 11/2003 | Ellis |
| 2004/0153740 A1 | 8/2004 | Fujimoto |
| 2005/0033455 A1 * | 2/2005 | Kasdan et al. ................ 700/12 |
| 2005/0177755 A1 | 8/2005 | Fung |
| 2005/0210304 A1 | 9/2005 | Hartung |
| 2007/0220316 A1 | 9/2007 | Guha et al. |

OTHER PUBLICATIONS

Colarelli et al., The Cas for Massive Arrays of Idle Disks (MAID), Dept of Computer Science, Univ. of Colorado, Boulder, pp. 1-6, Jan. 7, 2002.

Patterson et al., "A Case for Redundant Arrays of Inexpensive Disks (RAID)," ACM, pp. 109-116, 1998.

Chase et al., "Managing Energy and Server Resources in Hosting Centers," Dept of Computer Science, Duke University, pp. 14, Oct. 2001.

* cited by examiner

| Bit<br>Byte | 7 | 6 | 5 | 4 | 3 | 2 | 1 | 0 |
|---|---|---|---|---|---|---|---|---|
| 0 | Peripheral Qualifier<br>00xx | | | | Peripheral Device Type<br>00h | | | |
| 1 | RMB<br>0 | Reserved<br>00h | | | | | | |
| 2 | ANSI Approved Version<br>05h | | | | | | | |
| 3 | 0 | 0 | NACA<br>0 | HiSup<br>0 | Response Data Format<br>02h | | | |
| 4 | Additional Length (n-4) | | | | | | | |
| 5 | SCCS<br>0 | ACC<br>0 | ALUA<br>0 | | 3PC<br>0 | 0 | 0 | 00h |
| 6 | BQUE<br>0 | ENCSER<br>0 | VS<br>0 | MultiP<br>0 | 0 | 0 | 0 | 0 |
| 7 | RelAdr<br>0 | 0 | 0 | Sync<br>0 | LINKED<br>0 | TrnDis<br>0 | CMDQUE<br>1 | VS<br>0 |
| 8<br>:<br>15 | Vendor Identification<br>"XXXXXXXX" | | | | | | | |

FIG. 9A

| Bit / Byte | 7 | 6 | 5 | 4 | 3 | 2 | 1 | 0 |
|---|---|---|---|---|---|---|---|---|
| 16 : 31 | Product Identification xxxx-yyyyy ||||||||
| 32 : 35 | Product Revision Level xxxx ||||||||
| 36 : 43 | Controller Serial Number ||||||||
| 44 : 55 | Unused ||||||||
| 56 : 95 | Reserved ||||||||
| 96 : n | Copyright Notice "© xxxx YYYYYYYY, INC. all rights reserved." ||||||||

FIG. 9B

HIGH-DENSITY STORAGE SYSTEMS USING HIERARCHICAL INTERCONNECT

CLAIM OF PRIORITY

This application claims priority to the following application that is hereby incorporated by reference as if set forth in full in this application:

U.S. Provisional Patent Application Ser. No. 60/501,277 entitled 'High-Density Storage Systems Using Hierarchical Interconnect', filed on Sep. 9, 2003.

RELATED APPLICATIONS

This application is related to the following applications which are hereby incorporated by reference as if set forth in full in this specification:

Co-Pending U.S. patent application Ser. No. 10/691,838 entitled "Method for a Workload Adaptive High Performance Storage System with Data Protection," filed on Oct. 25, 2002;

Co-Pending U.S. patent application Ser. No. 10/607,932 entitled "Method and Apparatus for Power Efficient High-Capacity Storage System" filed on Sep. 12, 2002.

BACKGROUND

The present invention relates in general to digital processing and more specifically to a data storage system using hierarchical interconnection.

Typically, in computing devices, data storage systems consist of storage devices such as, hard disk drives, floppy drives, tape drives, compact disks, and the like. An increase in the amount and complexity of these applications has resulted in a proportional increase in the demand for larger storage capacities. Consequently, the production of high capacity storage devices has increased in the past few years. However, these storage devices with large storage capacities also demand high reliability and reasonably high data transfer rates. Moreover, the storage capacity of a single storage device cannot be increased beyond a certain limit. Hence, various data storage system configurations and topologies using multiple storage devices are commonly used to meet the growing demand for increased storage capacity.

A configuration of the data storage system to meet the growing demand involves the use of multiple smaller storage devices. Such a configuration permits redundancy of stored data. Redundancy ensures data integrity in case of device failures. In many such data storage systems, recovery from common failures can be automated within the data storage system itself using data redundancy and parity generation with the help of a central controller. However, such data redundancy schemes may be an overhead to the data storage system. These data storage systems are typically referred to as Redundant Array of Inexpensive/Independent Disks (RAID). The 1988 publication by David A. Patterson, et al., from University of California at Berkeley, titled 'A Case for Redundant Arrays of Inexpensive Disks (RAID)', describes the fundamental concepts of the RAID technology.

There are several issues associated with high-capacity storage systems. As the number of drives increases, complexity of logic for switching between drives and the delays involved in parity computation increase exponentially, thereby reducing the system performance in terms of disk input/output. An increase in the number of drives also requires an efficient interconnect scheme for movement of data and control signals between the controller and the drives. Furthermore, disk-based storage systems, having a large number of drives, consume more power than tape based systems of equal storage capacity. This is because tape drives can support a large number of removable cartridges in a single automated library. Therefore, storage on multiple disk drives consumes more power than the equivalent tape drive system. In addition, as the number of powered drives increases, the probability of failure of a disk drive also increases. Therefore, it is desirable that data integrity and disk reliability be maintained.

SUMMARY

In a preferred embodiment, a data storage system provides a central controller to manage and control a data storage system. The controller uses a hierarchical interconnect architecture, providing scalability for any number of drives. Data protection schemes such as RAID maintain reliability and data integrity. In addition, the controller can be used in a power-managed workload adaptive environment, improving the performance of the system in terms of power efficiency and input/output.

One embodiment is directed towards a high-capacity data storage system. The data storage system includes at least one data storage unit and a storage controller. Each data storage unit includes storage drives that are arranged in a hierarchical manner. A first tier storage enclosure includes one or more second tier storage enclosures. Each second tier storage controller further includes one or more third tier storage enclosures and so on; the lowest level of storage consisting of individual drives. The storage controller includes a hierarchy of controllers. A first tier controller is connected to one or more second tier controllers. Each second tier controller is connected to one or more third tier controllers and so on. Each controller is connected to the next tier of controllers through switches. In accordance with an embodiment of the present invention, the data storage system also utilizes a data protection scheme. An example of such a scheme is RAID. The data storage system comprises a processor and a memory for implementation of the data protection scheme.

In one embodiment the invention provides an apparatus for coupling a host to a drive in a data storage system, the data storage system comprising a plurality of drives, the apparatus comprising: a first tier controller, the first tier controller receiving a request from the host to couple to the drive; and at least one second tier controller, the second tier controller coupling the drive to the host through the first tier controller.

In another embodiment the invention provides A data storage system, the data storage system receiving requests to store and retrieve data from hosts, the data storage system comprising: one or more data storage units, the data storage units comprising a plurality of drives arranged in a hierarchical manner; and a storage controller, the storage controller coupling a host to a drive requested by the host for a read or a write operation through a hierarchy of storage controllers.

In another embodiment the invention provides A method for coupling a host device to a drive in a data storage system, the data storage system comprising one or more drives, a first tier controller and at least one second tier controller, the method comprising: the first tier controller receiving a request from the host to couple to a drive; identifying a second tier controller associated with the drive; and connecting the host to the drive through the first tier controller and the second tier controller.

BRIEF DESCRIPTION OF THE DRAWINGS

Various embodiments of the invention will hereinafter be described in conjunction with the appended drawings provided to illustrate and not to limit the invention, wherein like designations denote like elements, and in which:

FIG. 9A illustrates a first portion of an exemplary command set for communication between the first tier controller and the second tier controller; and FIG. 9B illustrates a second portion of an exemplary command set for communication between the first tier controller and the second tier controller.

DESCRIPTION OF PREFERRED EMBODIMENTS

A preferred embodiment provides an apparatus and a method for coupling a host to a drive in a data storage system using a hierarchical interconnect, or any other form of coupling. The interconnect comprises several layers of controllers that selectively couple a host to a requested drive through switches.

Figure 1:
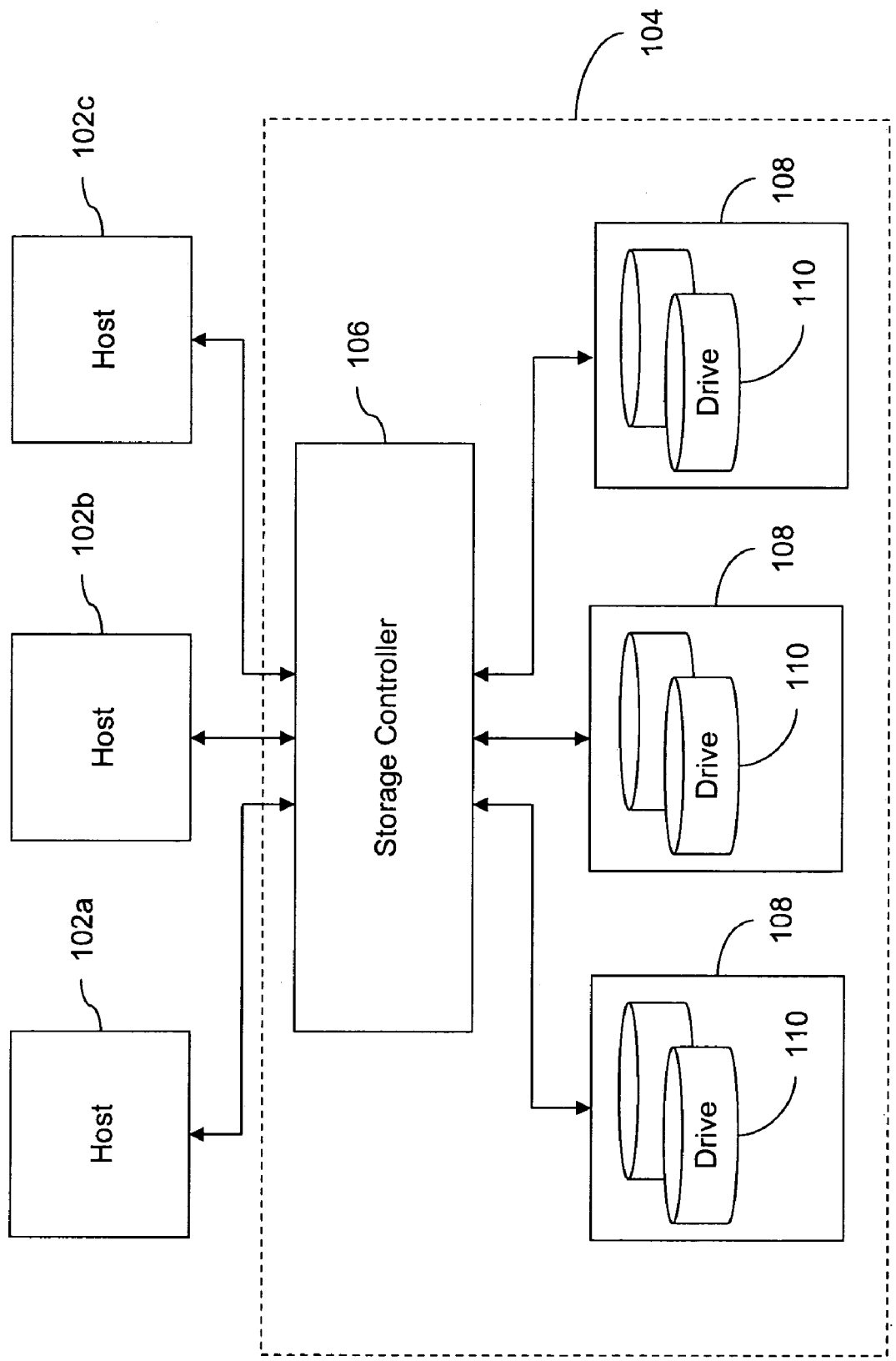
FIG. 1 is a block diagram of an exemplary data storage system and its environment.

FIG. 1 is a block diagram showing an exemplary data storage system and its environment. One or more hosts 102 are connected to a data storage system 104. The various elements of data storage system 104 will be explained in detail in conjunction with FIG. 2 and FIG. 3. Hosts 102 can be in the form of computer servers, stand-alone desktop computers, personal computers (PCs), workstations and the like. In general, any type of process, processor or device may act as a host. Hosts 102 have storage applications running on them. Applications that carry out data read/write operations and, hence, require data storage capacity, are termed as storage applications. These applications may require data transfer operations to storage units or to other applications. It should be noted that, for the purposes of this disclosure, identical items in the figures may be indicated by identical reference numerals followed by a lowercase letter, for instance, 102a, 102b, and so on. These items may hereinafter be collectively referred to by the reference numeral.

Hosts 102 can be connected to data storage system 104, using a network or other suitable interconnect means. Data storage system 104 comprises a storage controller 106 and one or more data storage units 108. Each data storage unit 108 further comprises drives 110. The arrangement of drives 110 in data storage unit 108 will be explained in conjunction with FIG. 2. Drives 110 can be any type of storage resource such as magnetic disk drives, tape drives, optical drives, random access memory (RAM), etc. The examples of a host and drives cited here are only for illustrative purposes and do not limit the scope of the invention.

Figure 2:
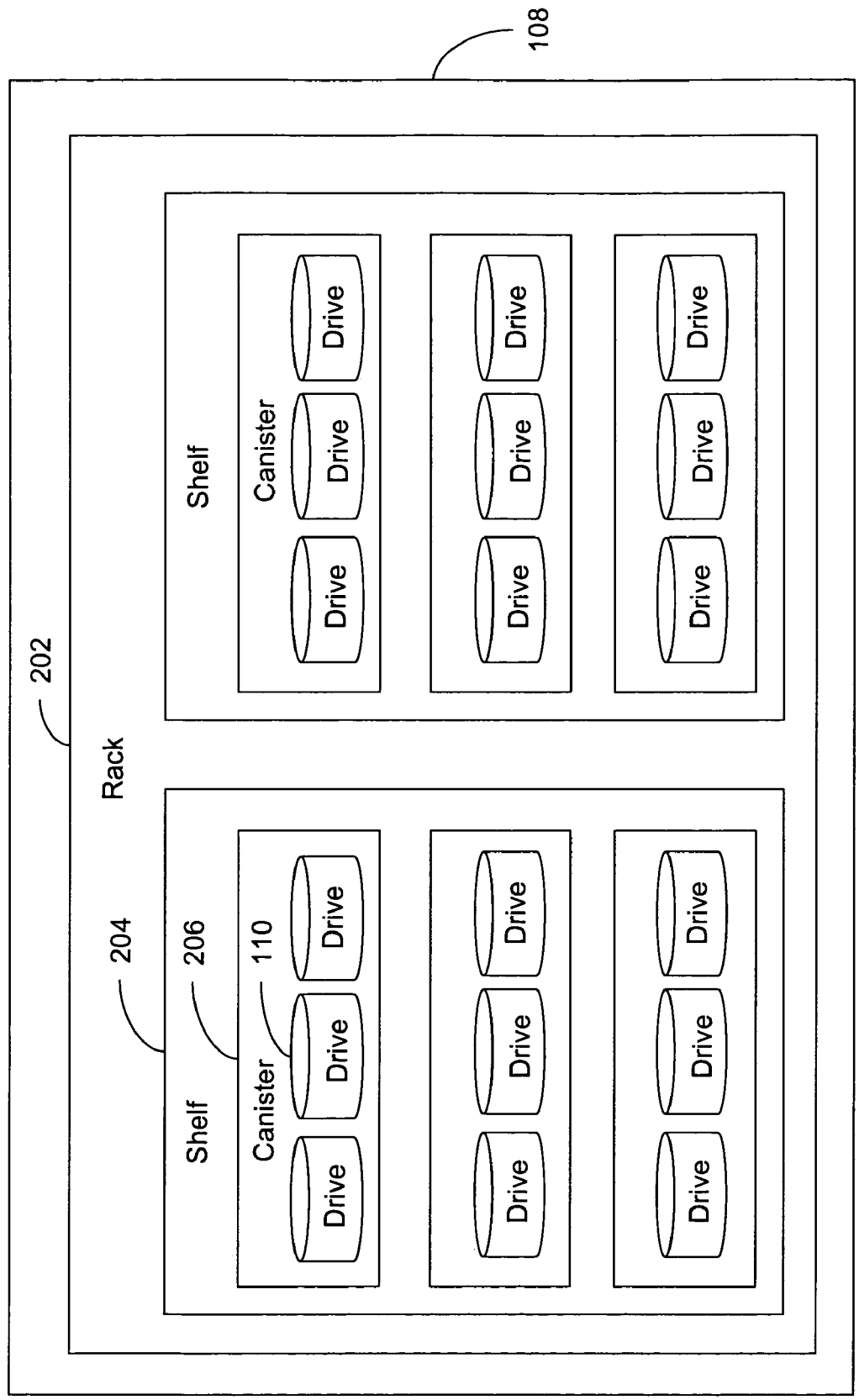
FIG. 2 is a block diagram showing a hierarchical arrangement of drives, in accordance with an embodiment of the present invention.

FIG. 2 is a block diagram showing hierarchical arrangement of drives in data storage unit 108, in accordance with an embodiment of the present invention. The arrangement includes a rack 202, which is a first tier storage enclosure. Rack 202 includes one or more shelves 204, which are second tier storage enclosures. Shelf 204 further comprises one or more canisters 206, which are third tier storage enclosures. An exemplary data storage system 104 of 896 drives comprises one rack 202. Rack 202 includes eight shelves 204. Each shelf 204 further includes eight canisters 206, each canister 206 including 14 disk drives 208. The exemplary storage system described above has drives arranged in four tiers of storage enclosures. It will be apparent to a person skilled in the art that the number of tiers of storage enclosures may vary according to the total number of drives in the storage system.

Figure 3:
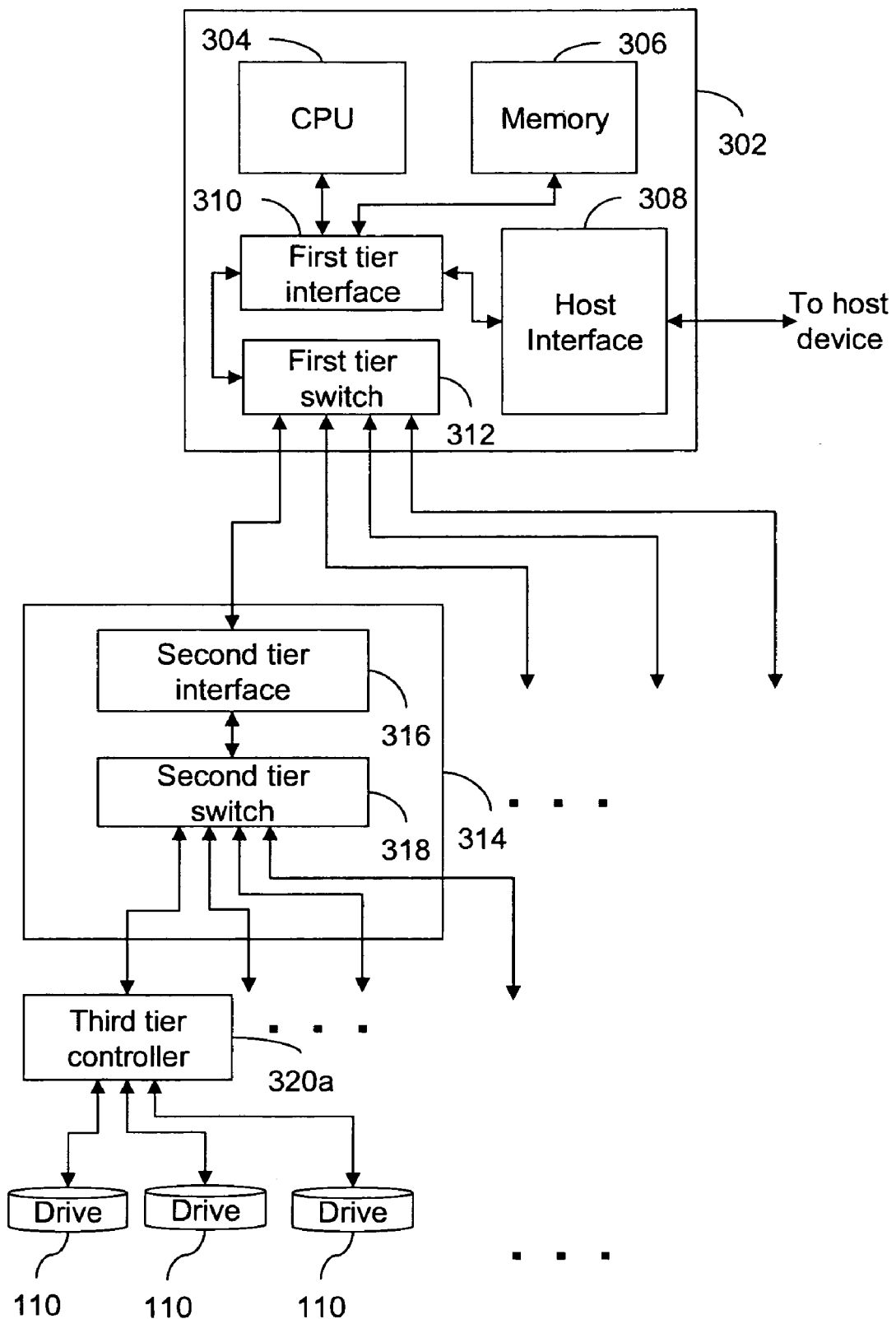
FIG. 3 is a block diagram showing elements of a hierarchical control system, in accordance with an embodiment of the present invention.

FIG. 3 is a block diagram showing the elements of a hierarchical control system, in accordance with one embodiment of the present invention. The hierarchical control system is a part of storage controller 106. Storage controller 106 comprises a first tier controller 302, a second tier controller 314 and a third tier controller 320, arranges in a hierarchical fashion. First tier controller 302 comprises a host interface 308, a first tier interface 310, a first tier switch 312, a Central Processing Unit (CPU) 304 and a memory 306. CPU 304 is used by first tier controller 302 for determining the location of a drive requested by a host 102. CPU 304 also determines the second tier controller 314 associated with the requested drive. Memory 306 is a cache memory for storing frequently accessed data. In accordance with an embodiment of the present invention, memory 306 is in the form of SDRAM chips. First tier controller 302 communicates with hosts 102 through host interface 308. Examples of host interface 308 include Fiber Channel Interface, SCSI host adapter, SATA Interface, and iSCSI host adapter. Host interface 308 communicates with CPU 304 and memory 306 through first tier interface 310. First tier switch 312 is connected to CPU 304, memory 306 and host interface 308 through first tier interface 310. In accordance with an embodiment of the present invention, first tier switch 312 comprises one or more ports, each port connected to a second tier controller 314.

Second tier controller 314 comprises second tier interface 316 and second tier switch 318. Second tier interface 316 is connected to first tier switch 312 and to second tier switch 318. Second tier interface 316 is used to enable communication between first tier controller 302 and second tier controller 314 that may be using different communication methodologies. Examples of such communication methodologies include PCI-X channels, Serial Advanced Technology Attachment (SATA) channels and Fiber Channel interconnects.

In accordance with an embodiment of the invention, storage controller 106 further includes third tier controller 320. Third tier controller 320 selectively connects second tier controller 314 with one or more requested drives 110.

In accordance with an embodiment of the present invention, storage controller 106 also performs data protection functions. Data protection includes prevention of data loss in the event of disk failures. Data protection can be achieved using a RAID redundancy or parity protection. RAID stands for Redundant Array of Inexpensive/independent Drives. Storage controller 106 may provide support for various RAID data organization schemes and combinations. The RAID scheme and various RAID levels are well known in the art and, their use in data protection should be apparent to anyone skilled in the art.

Figure 4:
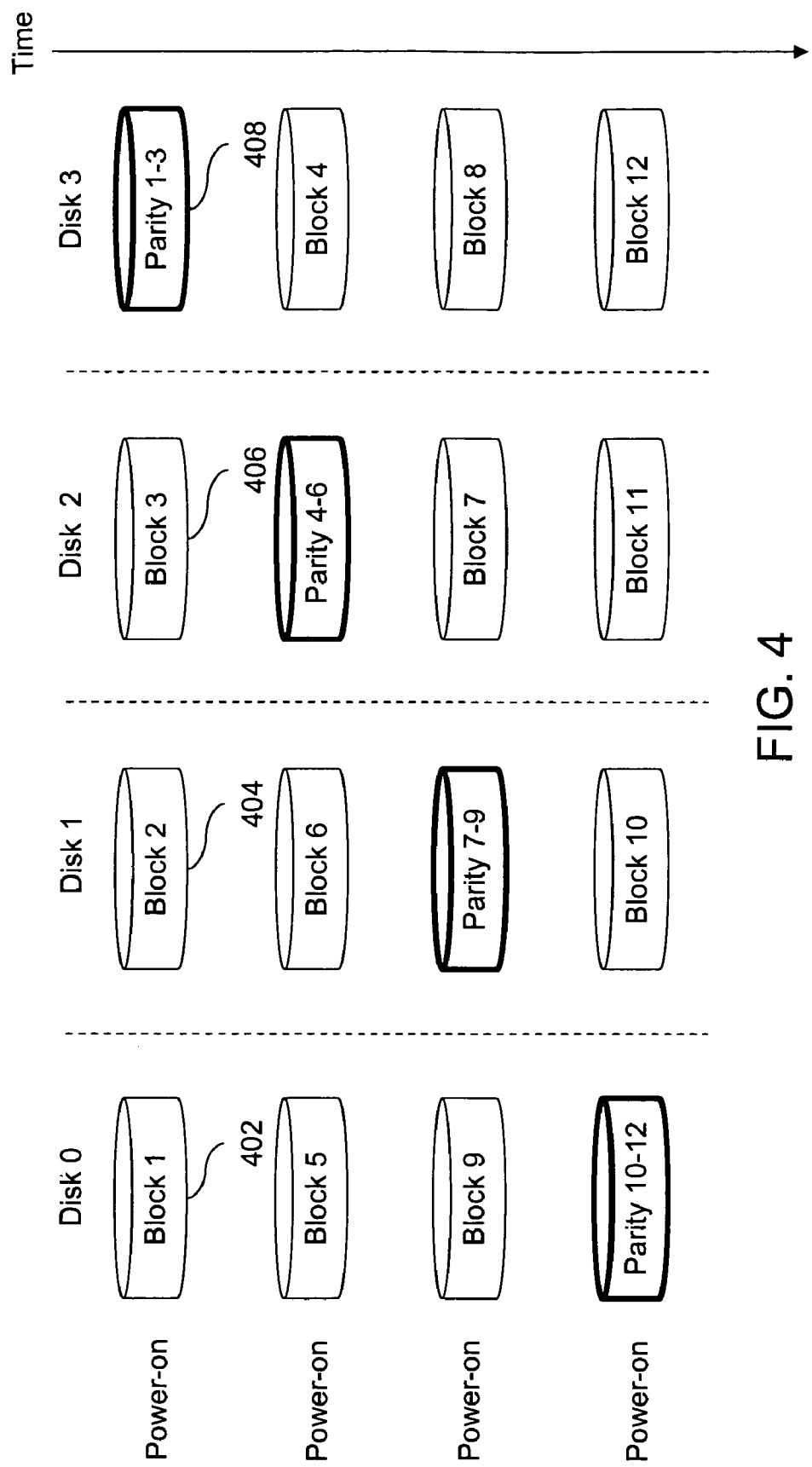
FIG. 4 is a block diagram illustrating a RAID data protection scheme, in accordance with an embodiment of the invention.

Since data protection schemes like RAID use a redundancy of disks, this leads to an overall increase in power consumption by the storage system. For instance, in RAID 5 scheme, data and parity are written in rotating fashion on multiple drives. Hence, all drives are required to be in power-on state. FIG. 4 is a block diagram illustrating a RAID data protection scheme, in accordance with an embodiment of the present invention. The data protection scheme illustrated is a 3+1 RAID 5 scheme. This scheme includes four data drives, namely 402, 404, 406, and 408. States of the drives at different instances of time are shown in FIG. 4. In the illustrated RAID scheme, data and parity are written onto all the drives simultaneously. In order to perform a write operation on this RAID set, all the drives 402, 404, 406, and 408 need to be in power-on state simultaneously. The present invention can also be practiced in a power-managed scheme where all drives need not be powered on simultaneously. This scheme is suitable for systems that are power constrained. An example, of this type of power-managed scheme has been described in the co-pending US patent application number 'Method and Apparatus for Power Efficient High-Capacity Storage System', referenced above. In this scheme, sequential writing onto disk drives is implemented, unlike simultaneous writing as performed in RAID 5 scheme. Sequential writing onto drives saves power because it requires powering up of one disk drive at a time. This power-managed RAID scheme will hereinafter be referred to as Redundant Array of Independent Volumes (RAIV).

Figure 5:
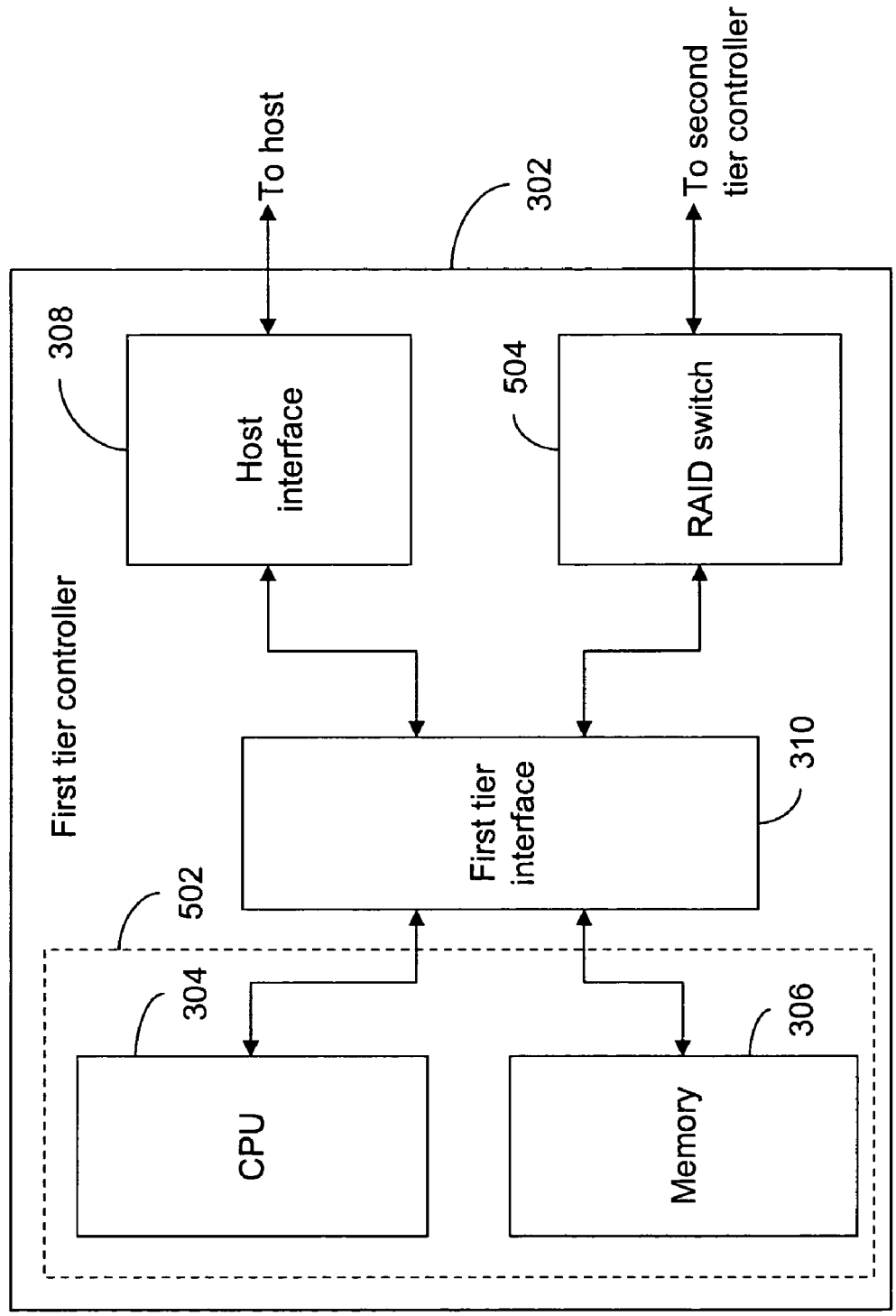
FIG. 5 is a block diagram showing an exemplary first tier controller with RAID functionality.

In accordance with an embodiment of the invention, data protection may be implemented at first tier controller 302. FIG. 5 is a block diagram showing an exemplary first tier controller 302 with data protection functionality. First tier controller 302 comprises a data protection controller 502. In accordance with an embodiment if the invention, data protection controller is a RAID controller. CPU 304 provides processing functionality for RAID functions such as parity generation. Memory 306 can be used as cache memory for storing frequently accessed data in order to improve the performance of the system. Data protection controller 502 further comprises RAID switch 504, which is connected to one or more second tier controllers 314.

Figure 6:
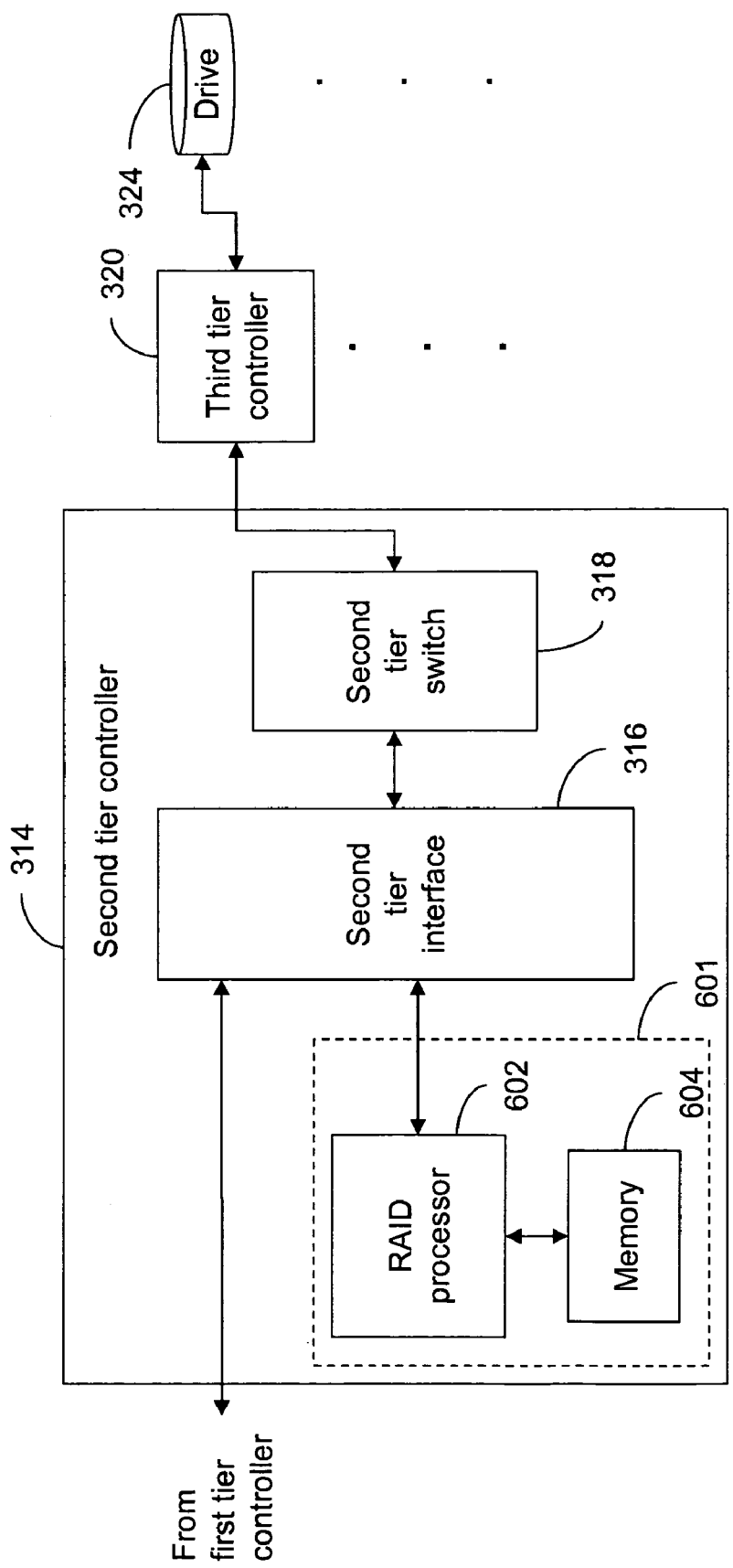
FIG. 6 is a block diagram showing an exemplary second tier controller with RAID functionality.

In accordance with another embodiment of the invention, data protection is implemented at second tier controller 314. FIG. 6 is a block diagram showing an exemplary second tier controller 314 with data protection functionality. Second tier controller 314 comprises data protection controller 601. In accordance with an embodiment of the invention, data protection controller 601 is a RAID controller. Data protection controller 601 further comprises RAID processor 602 and memory 604. RAID processor 602 provides processing functionality for RAID functions such as parity generation. Memory 604 is used as a cache memory for storing frequently accessed data. RAID processor 602 is connected to second tier switch 318 through second tier interface 316.

In accordance with another embodiment of the invention, data protection is implemented at third tier controller 320. Third tier controller 320 comprises a data protection controller. In accordance with an embodiment of the invention, the data protection controller is a RAID controller. The RAID controller further comprises a RAID processor and a memory.

Figure 7:
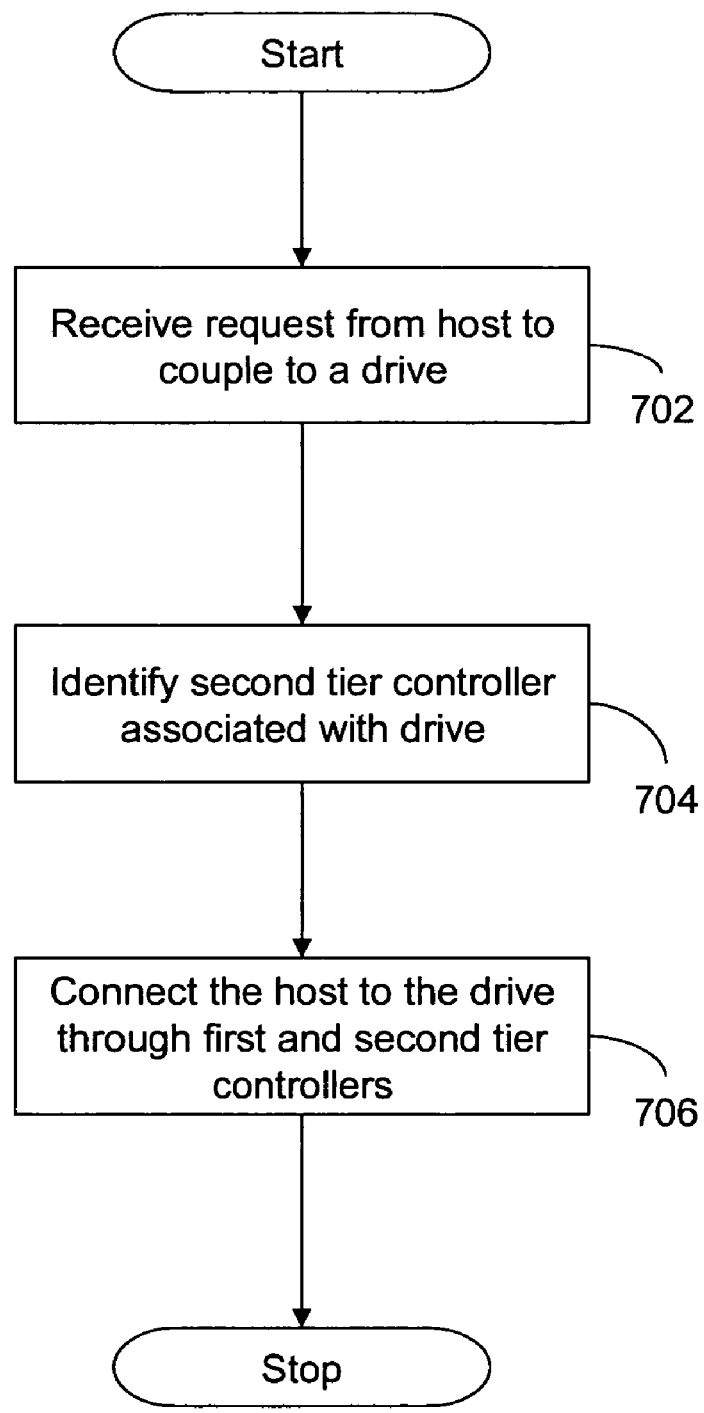
FIG. 7 is a flowchart illustrating the method of interconnecting a host to a drive, in accordance with an embodiment of the present invention.

The various steps for connecting a host to a requested drive are discussed below in association with a flowchart shown in FIG. 7. At step 702, request for access to drive 324 is received from host 102 by first tier controller 302. The request may be for a read or a write access. At step 704, first tier controller 302 identifies a second tier controller 314 associated with the drive. First tier controller 302 connects to identified second tier controller 314. Host 102 is then connected to the requested drive through first tier controller 302 and second tier controller 314 at step 706.

The invention can be used in conjunction with a workload adaptive system of data storage wherein different data organization schemes are provided to handle varying workload profiles. The method has been explained in the co-pending US patent application entitled 'Method for a Workload Adaptive High performance Storage System with Data Protection', referenced above. Workload can be characterized by various parameters such as volume size allocated, target Input/Output (I/O) rate, I/O size, and access pattern. Access pattern can include the manner in which the volume is accessed with reference to time. Based on these parameters, performance characteristics such as target storage unit, I/O rate, and RAID configuration are selected for optimal performance.

Figure 8:
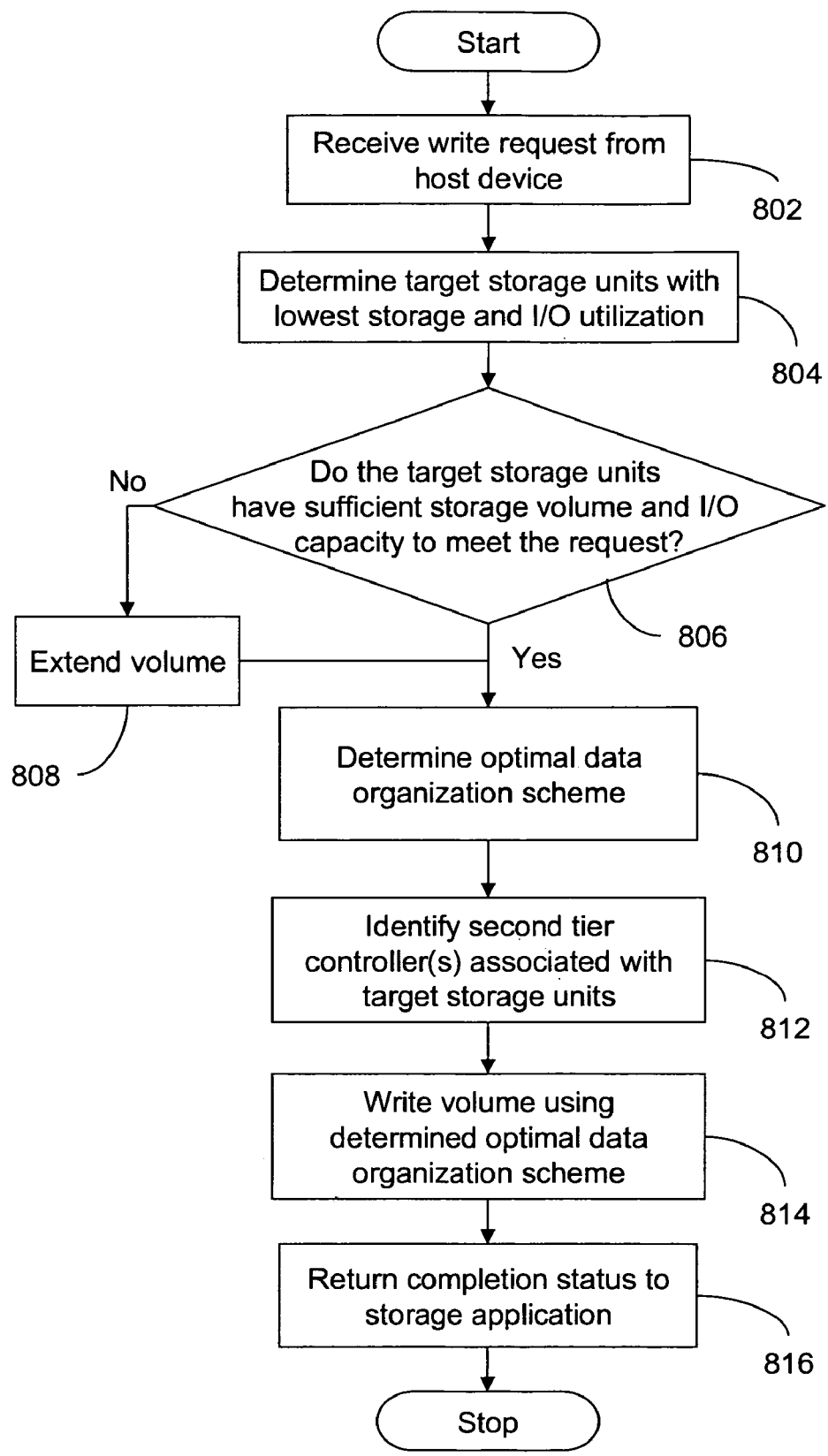
FIG. 8 is a flowchart illustrating the method of writing data onto a drive in a workload adaptive data storage system, in accordance with an embodiment of the present invention.

FIG. 8 is a flowchart illustrating the steps for coupling a host with a requested drive for a write operation in a workload adaptive storage environment. At step 802, a write request for a volume is received from host 102 along with a volume identifier or a Logical Unit Number (LUN). The volume identifier or LUN represents the volume of data that is to be written. The access pattern specifies access frequency or temporal access pattern to the storage volume. The received write request may be mapped to any one of disk drives 402, 404, 406, and 408 by using the logical block address of the configured LUN.

At step 804, storage controller 106 determines data storage units 108 having a combination of the lowest utilized storage capacity and the least I/O. These data storage units are referred to as target data storage units. At step 806, the target data storage units are checked for sufficient storage and I/O capacity to meet the volume request. If no target data storage unit has sufficient storage capacity and I/O capacity to meet the current volume request, then the available volume is extended by adding in unallocated drives to the volume at step 808.

On determination of the target data storage units, at step 810, storage controller 106 determines an optimal data organization scheme, e.g., RAID or RAIV, which would optimize the I/O performance. In other embodiments, different criteria can be used to direct data organization (or other characteristic) selection. For example, storage use and availability, human design, or other criteria can be used. After choosing a RAID or RAIV format, first tier controller 302 identifies second tier controller(s) 314 associated with the target data storage units at step 812. Second tier controller 314 maps and writes the volume to specific drives 110 in data storage unit 108 at step 814. Once the volume is written, a completion status is sent to host 102 at step 816. The completion status indicates successful completion of the write operation on data storage system 104. This completion status serves as an acknowledgement signifying the completion of the write request.

Communication between the first tier controller 302 and the second tier controller 314 is carried out through specific command sets defined in the second tier controller firmware. In general, any type and format of commands, interface, or communication mechanism can be used between the various tiers in the hierarchy. In accordance with an embodiment of the invention, second tier controller 314 is configured as a single N_port. A standard 64-bit IEEE register identifier is used as an ID for identification purposes. This ID consists of a Network Address Authority number, an IEEE company ID, and a vendor specified identifier.

An exemplary inquiry data format that is used for device identification by second tier controller 314 is shown in a table in FIG. 9A and continued in FIG. 9B. Details of this inquiry data format are described, for example, in "T10 SCSI Primary Commands—3 (SPC-3)". The information contained in FIG. 9A and FIG. 9B is applicable for a disk device type returned by the second tier controller firmware. Information conveyed by standard fields shown in FIG. 9A and FIG. 9B is known in the art. The format of vendor specific fields will be explained below in accordance with an embodiment of the invention.

Peripheral Qualifier field is set equal to 00xx (the first two bits of a four-bit hex value are zero), which indicates that there is a physical device on this logical unit, whether connected or not. Peripheral Device Type field is set to zero, which indicates that the device is a magnetic type storage device. RMB field is set to zero, because the medium is not removable. ANSI version field is set to zero, indicating that the controller is in compliance with ANSI SPC-3. Normal Auto Contingent Alliance (NACA) bit is set to zero which indicates that the device server does not support a NACA bit set to one and does not support the NACA standards attribute (see, e.g., SPC-3 at page 142).

HiSup bit is set to zero, indicating that the controller does not use the hierarchical addressing model. Response Data Format field is set to 02h since that controller does not conform to the SCC-2 specification. ACC (Access Controls Coordinator) bit is reset to zero, which indicates that the device contains an access controls coordinator or a CPU at LUN0 and not a disk device. The value in the Asymmetric Logical Units Access (ALUA) field indicates whether or not the logical unit supports asymmetric logical unit access and if so, whether implicit or explicit management is supported. ALUA is assigned a value of 00h. 3PC field is set to zero, indicating that third party copy is not supported. The additional length field specifies the length (in bytes) of the parameters.

If the allocation length is less than the number of data bytes of the parameters, the additional length is not adjusted to reflect the truncation. Basic Queuing bit is set to zero because the controller supports command queuing. Consequently, the CMDQUE bit is set to one. Enclosure Services (ENCSER) bit is set to zero indicating that enclosure service is not supported by the controller. MultiP field is set to zero, which indicates that the controller is not a dual port device. Bytes 8 to 15 are used for vendor identification. This field contains vendor identification data, for instance, the vendor's name encoded in ASCII format. Bytes 16 to 31 are reserved for product identification. These contain the controller model number in a specified format, for instance, 8814-XXXXXXXX or 8818-XXXXXXXX. Bytes 32 to 35 indicate the product revision level. This field contains the ASCII data of the last four digits of the firmware. Bytes 36 to 43 contain the controller serial number. Bytes 44 to 55 are left unused. Bytes 56 to 95 are reserved. The remaining 48 bytes contain the ASCII data of the copyright notice.

Although the invention has been described with reference to specific embodiments thereof, these embodiments are merely illustrative, and not restrictive, of the invention. For example, although a storage system with hierarchical controller has been described in connection with both power management and workflow adaptive features, such features can be used in conjunction with, or separately from, different embodiments. Other embodiments can use a hierarchical controller to advantage with other aspects of a storage system. For example, the hierarchical controller can be used with a system that is part of a SAN network, with RAID, RAIV or other storage formats or configurations, in association with non-hierarchical types of controllers, etc.

Although terms such as "mass storage device," "disk drive," etc., are used, any type of storage unit can be adaptable to work with the present invention. For example, disk drives, tape drives, random access memory (RAM), etc., can be used. Different present and future storage technologies can be used such as those created with magnetic, solid-state, optical, bio-electric, nano-engineered, or other techniques. Mass storage devices refer to possible techniques and storage devices for storing large amounts of data and include all types of disk drives and tape drives.

Storage units can be located either internally inside a computer or outside a computer in a separate housing that is connected to the computer. Storage units, controllers, tiers and other components of systems discussed herein can be included at a single location or separated at different locations. Such components can be interconnected by any suitable means such as with networks, communication links or other technology.

Although specific functionality may be discussed as operating at, or residing in or with, specific places and times, in general the functionality can be provided at different locations and times. For example, functionality such as data protection steps can be provided at different tiers of a hierarchical controller. Any type of RAID or RAIV arrangement or configuration can be used.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "processor" or "process" includes any human, hardware and/or software system, mechanism, or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Moreover, certain portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or"- unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. In addition, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus for coupling a host to a drive in a data storage system, the data storage system comprising a plurality of drives, the apparatus comprising:
   a first tier controller, the first tier controller receiving a request from the host to couple to the drive; and
   a plurality of second tier controllers, each second tier controller associated with a set of drives and configured to perform a data protection operation associated with the set of drives,
   wherein the first tier controller configured to determine a location of the drive and a second tier controller in the plurality of second tier controllers associated with the drive, the first tier controller configured to route the request to the determined second tier controller,
   wherein the determined second tier controller is configured receive the request and is configured to perform a data protection operation with the drive, the second tier controller coupling the drive to the host through the first tier controller, wherein the first tier controller and the second tier controller are included in a same storage controller enclosure and the first tier controller and the second tier controller perform operations together to form a hierarchal control system in the enclosure.

2. The apparatus according to claim 1, wherein the first tier controller operates in a first tier storage enclosure.

3. The apparatus according to claim 1, wherein the first tier controller further comprises:
   a host interface, the host interface connecting the host to the first tier controller,
   a first tier switch, the first tier switch connected to one or more second tier controllers; and
   a first tier interface, the first tier interface connected to one or more second tier controllers through the first tier switch.

4. The apparatus according to claim 1, wherein the second tier controller operates in a second tier storage enclosure.

5. The apparatus according to claim 1, wherein the second tier controller further comprises:
   second tier interface, the second tier interface connected to the first tier interface,
   a second tier switch, the second tier switch connected to one or more drives.

6. The apparatus according to claim 5, wherein a third tier controller is selectively coupled to the second tier controller and to the disk drive.

7. The apparatus according to claim 6, wherein the third tier controller further comprises a third tier switch, the third tier switch coupling the host to the disk drive through the first tier controller and the second tier controller.

8. The apparatus according to claim 1 further comprising a data protection controller, the data protection controller protecting data from being lost.

9. The apparatus according to claim 8, wherein the data protection controller further comprises a memory.

10. The apparatus according to claim 8, wherein the data protection controller further comprises a processor.

11. The apparatus according to claim 8, wherein the data protection controller includes a RAID controller.

12. The apparatus according to claim 8, wherein the data protection controller is included in the first tier controller.

13. The apparatus according to claim 8, wherein the data protection controller is included in the second tier controller.

14. The apparatus according to claim 8, wherein the data protection controller is included in the third tier controller.

15. The apparatus according to claim 1, wherein the host is coupled to multiple drives at the same time.

16. The apparatus according to claim 1, wherein multiple hosts are coupled to one or more drives.

17. The apparatus according to claim 1, wherein a drive includes a tape drive.

18. The apparatus according to claim 1, wherein a drive includes a hard disk drive.

19. The apparatus according to claim 1, wherein a plurality of drives provides data requested by the host.

20. The apparatus of claim 1, further comprising a plurality of third tier controllers configured to couple the plurality of second tier controllers to their associated drives, wherein the first tier controller, the second tier controller, and the plurality of third tier controllers are included in the same storage controller enclosure and the first tier controller, the second tier controller, and the plurality of third tier controllers perform operations together to form a hierarchal control system in the enclosure.

21. A method for coupling a host device to a drive in a data storage system, the data storage system comprising one or more drives, a first tier controller and a plurality of second tier controllers, the method comprising:
  receiving, at the first tier controller, a request from the host to couple to a drive;
  determining a location of the drive and a second tier controller in the plurality of second tier controllers associated with the drive, each second tier controller associated with a set of drives and configured to perform a data protection operation associated with the set of drives,
  routing, at the first tier controller, the request to the determined second tier controller;
  receiving, at the identified second tier controller, the request; and
  performing a data protection operation with the drive, the second tier controller coupling the drive to the host through the first tier controller, wherein the first tier controller and the second tier controller are included in a same storage controller enclosure and the first tier controller and the second tier controller perform operations together to form a hierarchal control system in the enclosure.

22. The method according to claim 21 further comprising: sending inquiry data to provide vendor identification information.

23. The method according to claim 22 further comprising: determining whether the requested data is present in a cache memory.

24. The method according to claim 22, wherein the inquiry data sent to provide vendor identification information is encoded in a command format.

25. The method according to claim 24 wherein the command format comprises a data field for identifying a magnetic type storage peripheral device connected to the storage controller 26. The method according to claim 24 wherein the command format comprises a data field for ascertaining whether a magnetic type storage peripheral device is removable.

27. The method according to claim 24 wherein the command format comprises a data field for ascertaining whether the storage controller uses hierarchical addressing.

28. The method according to claim 24 wherein the command format comprises a data field for providing vendor's name encoded in ASCII format.

29. The method according to claim 24 wherein the command format comprises a data field for indicating product revision level.

30. The method according to claim 24 wherein the command format comprises a data field for identifying controller serial number.

31. The method according to claim 24 wherein the command format comprises a data field for storing a copyright, notice encoded in ASCII format.

32. The method according to claim 21, wherein the request is received for a read operation.

33. The method according to claim 32, wherein the request is received for a write operation.

34. The method according to claim 33 further comprising: determining storage units having sufficient storage volume and input/output capacity.

35. The method according to claim 33 further comprising: determining optimal data organization scheme.

36. The method according to claim 33, wherein connecting the host to the drive further comprises:
  writing data on to the selected drive using determined data organization scheme; and
  returning completion status to the host.

37. The method according to claim 21, wherein the host is coupled to more than one drive at the same time.

38. The method of claim 21, further comprising coupling to a third tier controller in a plurality of third tier controllers, the third tier controller coupling the plurality of second tier controllers to their associated drives. wherein the first tier controller, the second tier controller, and plurality of third tier controllers are included in the same storage controller enclosure and the first tier controller, the second tier controller. and the plurality of third tier controllers perform operations together to form a hierarchal control system in the enclosure.

39. An apparatus configured to couple a host device to a drive in a data storage system, the data storage system comprising one or more drives, a first tier controller and a plurality of second tier controllers, the apparatus comprising:
  means for receiving, at the first tier controller, a request from the host to couple to a drive;
  means for determining a location of the drive and a second tier controller in the plurality of second tier controllers associated with the drive, each second tier controller associated with a set of drives and configured to perform a data protection operation associated with the set of drives,
  means for routing, at the first tier controller, the request to the determined second tier controller;
  means for receiving, at the identified second tier controller, the request; and
  means for performing a data protection operation with the drive, the second tier controller coupling the drive to the host through the first tier controller, wherein the first tier controller and the second tier controller are included in a same storage controller enclosure and the first tier controller and the second tier controller perform operations together to form a hierarchal control system in the enclosure.

* * * * *